July 7, 1970  F. A. DONALDSON  3,518,960
SPEED MODIFYING AND WARNING DEVICE FOR AUTOMOBILES
Filed Nov. 13, 1967  3 Sheets-Sheet 1
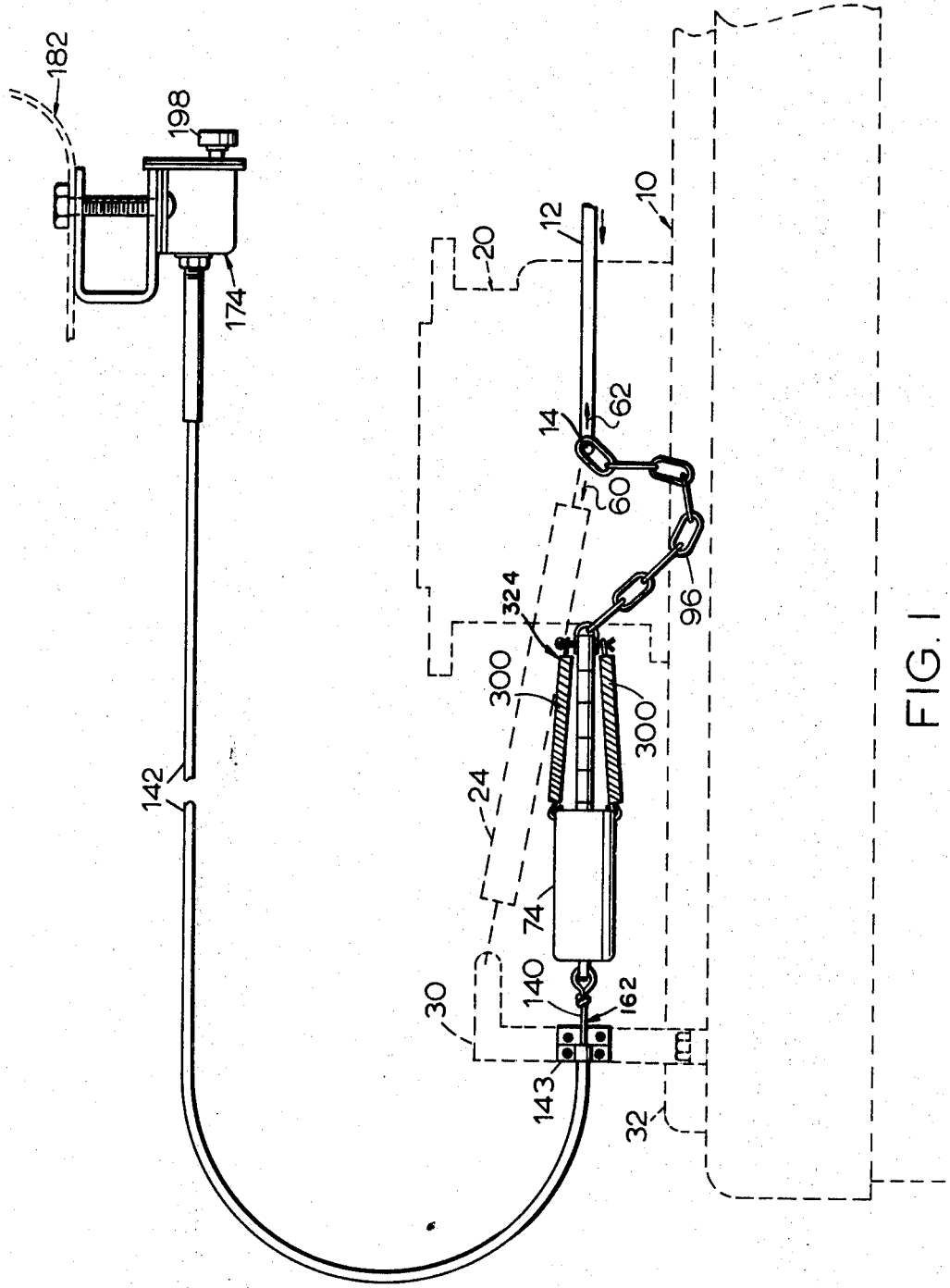
FIG. I
INVENTOR.
FRED A. DONALDSON
BY July 7, 1970        F. A. DONALDSON        3,518,960
SPEED MODIFYING AND WARNING DEVICE FOR AUTOMOBILES
Filed Nov. 13, 1967        3 Sheets-Sheet 2
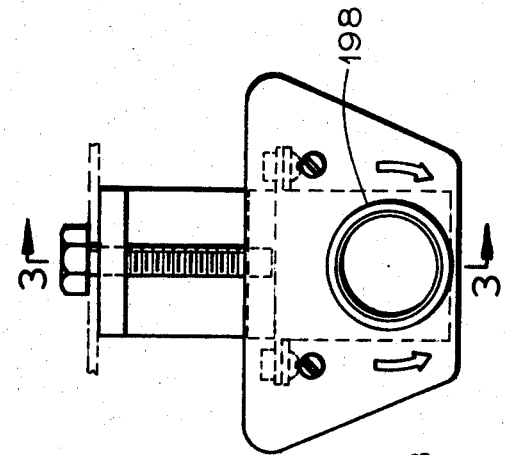
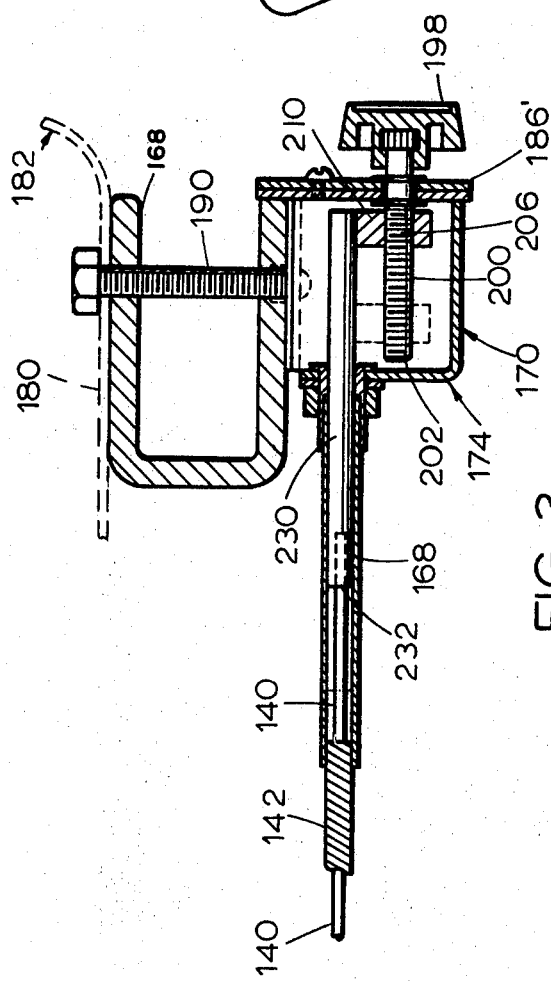
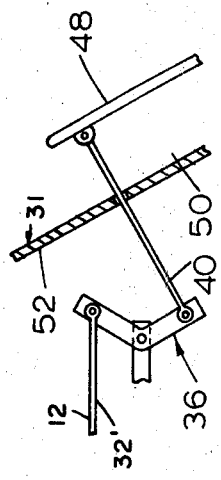
*INVENTOR.*
FRED A. DONALDSON
*BY*

July 7, 1970 F. A. DONALDSON 3,518,960
SPEED MODIFYING AND WARNING DEVICE FOR AUTOMOBILES
Filed Nov. 13, 1967 3 Sheets-Sheet 3
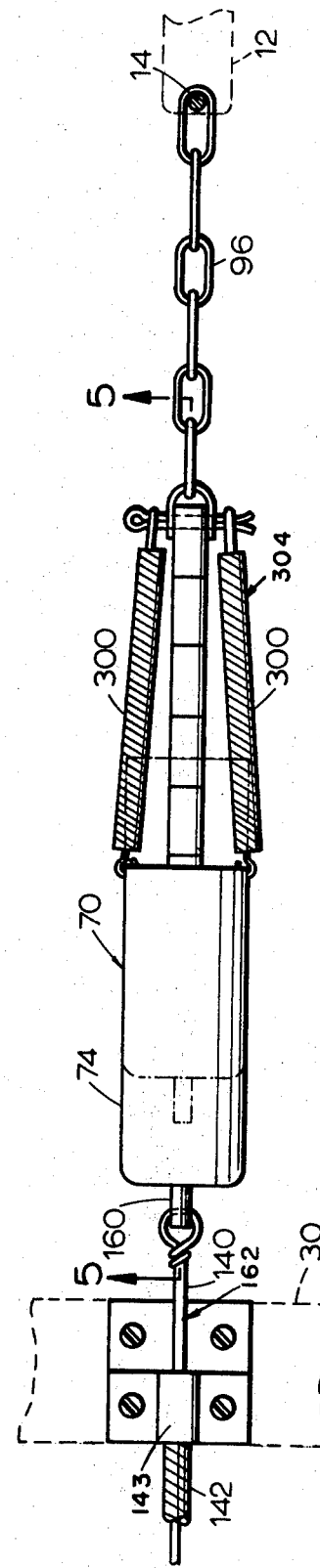
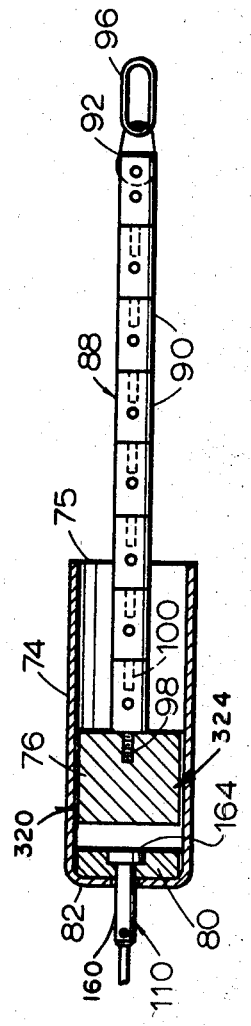
INVENTOR.
FRED A. DONALDSON

United States Patent Office 3,518,960
Patented July 7, 1970

1

3,518,960
SPEED MODIFYING AND WARNING DEVICE
FOR AUTOMOBILES
Fred A. Donaldson, 2068 South St.,
Blair, Nebr. 68008
Continuation-in-part of application Ser. No. 516,220,
Dec. 22, 1965. This application Nov. 13, 1967, Ser.
No. 699,275
Int. Cl. G01d 21/00
U.S. Cl. 116—114                                    7 Claims

ABSTRACT OF THE DISCLOSURE

An automobile having an engine provided with an accelerator pedal and having in combination means for providing an impedance to freedom of accelerator pedal depression which can be abruptly sensed by the operator through the accelerator pedal at a certain point of accelerator pedal depression so as to provide a speed warning device, the impedance means being also at least partially abruptly overcomable so that this can be easily sensed by the operator also through the accelerator pedal.

---

This application is a continuation-in-part of the applicant's co-pending patent application Ser. No. 516,220, filed Dec. 22, 1965, titled, Speed Warner for Automobiles, now abandoned.

In the prior art, numerous patents propose the placing of spring means under accelerator pedals. However, although such devices can serve as a speed warning, it is an object of this invention to provide a warning impedance means which is at least partially abruptly overcomable so that once the impedance is overcome, then a major part of the impedance ceases to be in effect, whereby thereafter the great resistance to accelerator depression, which is a characteristic of earlier patents of this field, is removed. In this way, the advantages of a speed warning device are attained but without, for the most part, making an automobile more cumbersome to drive.

More particularly it is an object of this invention to provide a speed warning device which utilizes the abrupt breaking away of a magnet from its keeper as a means of providing for a driver a warning which can be noticed or felt by the driver through the accelerator pedal.

A further object is to provide a warning device which can be adjusted so as to give a speed warning at any pre-selected speed a driver may set the device at by means of a convenient warning speed regulator in the driver's compartment.

Still another object is to provide a warning device as described which tends to support the accelerator pedal to a limited degree for preventing danger from unconscious foot pressure commonly known as the "heavy foot," thereby preventing unintended acceleration.

In the drawings:

FIG. 1 is a side elevation of the speed warning device of this invention shown as installed in an automobile, parts of the dashboard and engine of the automobile being shown in dotted lines, the device being shown in an inoperative position.

FIG. 2 is a rear elevation of the speed setting assembly of the invention as seen from the right in FIG. 3.

FIG. 3 is a sectional view taken along the line 3—3 of FIG. 2.

FIG. 4 is a detailed view showing the magnetic assembly and associated parts in a position at the beginning of break-away of a magnet from its keeper.

FIG. 5 is a sectional view taken along the line 5—5 of FIG. 4 with the exception that the magnet is shown in a position immediately after breaking away from its keeper.

2

FIG. 6 is a diagrammatic detail showing a conventional accelerator pedal area of an automobile with the floor board partly broken away and showing in section.

Referring to FIG. 1, an automobile engine is shown in dotted lines at 10 and has an accelerator rod 12 connected by a pin 14 to mechanism not shown which is a part of a carburetor assembly 20 of a conventional type. The accelerator rod 12 is urged forwardly by a conventional spring 24 fixed to a spring post 30 suitably mounted on the top of the housing 32 of the engine 10.

The automobile engine 10 can be regarded as being a part of an automobile generally indicated at 31. The automobile 31 has an engine 10 having an accelerator foot pedal 48 which is understood to be mounted by means not shown in a manner such that it is depressible for acceleration and rises for deceleration in a conventional and obvious manner, the automobile and its engine further having in combination means generally indicated at 324 in FIG. 1 for providing a momentary impedance to freedom of accelerator depression at a given and later described accelerator pedal position and overcomable by depressing the pedal 48 beyond such later described position, the momentary impedance provided by the momentary impedance providing means 324 being sensible by the operator through the accelerator pedal 48.

The engine 10 and the automobile 31 have an accelerator controlled linkage assembly 32' having a moving connecting pin 14 which is sometimes herein called a moving part 14, the moving part or pin 14 being further identified as being connected to the accelerator pedal 48 by the controlled linkage assembly 32 in a manner such that the part 14 moves in a first direction generally indicated by the arrow 62 in FIG. 1 as the accelerator pedal 48 is depressed and moves in a second direction indicated by arrow 60 in FIG. 1 in an opposite direction as the accelerator pedal rises.

This is accomplished because the accelerator linkage assembly 32 has among its parts an accelerator rod 12 attached to the connecting pin or moving part 14, a bell crank mechanism 36 shown in FIG. 6, and a shaft 40 connecting the bell crank 36 to the pedal 48 of the automobile, the pedal 48 being disposed in the driver's compartment 50 on the rear side of the fire wall 52. It will be understood that all parts of the linkage assembly 32 are conventional parts of many automobiles.

As thus described, the pin 14 moves in a first direction 62 as the accelerator pedal 48 is depressed and moves in a second direction 60 opposite to the first direction 62 as the accelerator pedal rises.

All the above parts are conventional and the parts of the warning device of this invention will now be defined and the device is generally indicated at 70 having a frame 74 preferably of cylindrical form having an open rearward end 75 and having a magnet 76 movably disposed in the frame 74 so as to slide both toward and away from a magnet keeper 80 fixed to a forward wall 82 of the frame 74.

An extension or adjustment shaft 88 having multiple interconnecting parts 90 is attached to the rearward side of the magnet 76 and has its opposite end 92 suitably attached to a chain 96 which has its opposite end connected to the pin 14.

The frame 74 has its forward wall 82 at its keeper end adjustably anchored to the automobile, as best seen in FIGS. 4 and 5, by suitable adjustable anchor means or flexible control cable generally indicated at 110 and having as its parts an elongated movable inner control wire 140 of flexible nature extending through a flexible outer covering 142 fixed at one end by a fitting 143 to the post 30, the latter mounted on the automobile, with the wire 140 movable with respect to both the covering 142 and the post 30 and the automobile, and with the rearward end of the wire 140 fixed by the fitting 160 to the housing 74 by means of a head end 164 embedded in the keeper 80, the head end being part of the fitting 160 extending through the forward side of the housing 74 and attached to the wire 140.

The flexible covering 142 extends upwardly and rearwardly and is fixed by a sleeve 168 to the body 170 of a speed regulation assembly or speed setting assembly 174, the body 170 being suitably attached to a portion 180 of the dashboard 182 of the automobile by means of a bracket 186, bolt 190 and with the body 170 disposed so that a face plate 186' on its rearward side can be readily seen by an operator in a driver's position in the automobile so that a knob 198 controlling a shaft 200 can be readily manipulated so that threads on the shaft 200, as seen at 202, extending through a threaded opening 206 in a controller nut 210 tend to cause the controller nut 210 to be moved forwardly and rearwardly in the housing 170.

The controller nut 210 is fixed to a tube 230 which slides backward and forward in the tube 168' with the forward end of the tube 230 fixed at 232 to the one end of the wire 140.

It will be seen that the springs 300 and the shaft 88 together form what can be called a magnet return means 304, the magnet return means, in a sense, also having parts of the housing 74 as parts thereof since the spring means is held by the housing 74 and is operatively correlated with the housing 74 and with the magnet 76 for urging the magnet 76 toward the keeper 80 and into engagement with the keeper 80 at times when the pulling means or chain 96 has slack in it.

In a sense, the magnet 76 and its keeper 80 together function as a motion resister generally indicated at 320, the motion resister exerting an abrupt resistance and impedance to further movement of the pin 14.

It will be seen that the impedance providing means mentioned in the claims is generally indicated at 324 in FIG. 5 and it includes the magnet 76 and its keeper 80 and also the springs 300, shaft 88 and all elements attaching the springs 300 and shaft 88 to the pin 14, and including the chain 96.

It will be seen that the impedance means thus described and indicated at 324 is an impedance which takes effect so abruptly as to be easily sensed by the automobile operator through the accelerator pedal, and the impedance means 324 is also at least partially overcomable so that this also can be easily sensed by the operator through the accelerator pedal. The term "partially abruptly overcomable" is used because while the magnet 76 and its attraction for the keeper 80 is abruptly overcomable, yet the springs 300 form a part of the impedance means 324 and they are not abruptly overcomable.

The spring post 30 can also be called the stationary part of the automobile 31 and means generally indicated at 162 in FIG. 1 connects the housing 74 to the stationary part or spring post 30 of the automobile, the connecting means 162 can also be called a connecting assembly 162 and has as its parts the fitting 160, the wire 140, a sleeve 143 connected to the spring post 30, the outer covering 142 and the speed setting assembly 174, the speed setting assembly 174 being identified as having as its main parts the tube 230, the nut 210, the threaded shaft 200, the housing 170 and the control knob 198, the bracket 168 and the bolt 190.

In operation it will be seen that when the accelerator pedal 48 has been depressed to a point such that the slack is taken out of the chain 96, that thereafter, further depression of the accelerator pedal will cause the magnet 76 to move away from the keeper 80 in an abrupt manner with the resistance of the magnet being suddenly overcome by the pressure of the foot of an operator so that this sudden breaking away of the magnet from its keeper being noticeable and sensible by the driver through the accelerator pedal warning the driver that the certain speed has been exceeded because the accelerator pedal has been depressed a certain amount.

Upon a rising of the accelerator pedal, springs 300 attaching the housing 74 to the chain 96, tend to cause the shaft 88 to urge the magnet 76 back into engagement with the keeper 80.

It will be seen that the device is conceived so that the position the housing 74 with respect to the position of the pin 14 when the chain 96 first becomes taut, will determine the approximate speed at which the magnet will pull free. Therefore, the position of the housing 74 is controlled by the wire 140 through the knob 198 as earlier described so a driver can set the knob 198 in a position corresponding to a desired speed of the automobile as he drives. A warning of speeds higher than the desired speed will be signaled by a break-away from the magnet. FIG. 4 shows the chain 96 in a taut position and the remaining parts of the impedance means 324 in the position just prior to break-away.

The reason the housing 74 is slidable with respect to the engine 10 and the automobile 31 is because the covering 142 is fixed at one end by the fitting 143 to the post 30, whereby a movement of the wire 140 as controlled by the knob 198 will cause movement of housing 74 with respect to the spring post 30 and automobile 31.

It is well-known that magnetic attraction is the greatest when two magnets or a magnet and keeper are the closest together. The spring or resilient means 300 has the effect, therefore, of urging the parts 76 and 80 of the impedance means 76, 80 closer together and, therefore, toward a positioning for maximum impedance effect of the impedance means 76, 80.

Thereafter, during hours of driving, adjustment can be made as desired and the desired speed will be signaled to the driver by the tautness of the impedance means 324.

In operation, it will be seen that the rod 12 can be called a moving member 12, whereby it is a moving member or rod 12 that is a part of the automobile 10 and to which the bell crank 36 and the shaft 40 are connected to form a means drivably correlating and connecting the moving member or rod 12 with the accelerator pedal 48.

A connecting means comprising the shaft 88 with its parts 90, chain 96, and pin 14 connect an impedance means or magnet 76 to the moving member or rod 12 to accomplish the operation described.

An overcomable impedance means positioning means is defined by the keeper 80, fitting 160, wire 162, and by the remainder of the speed setting assembly 174. The overcomable impedance means positioning means thereby is operably correlated with the impedance means or magnet 76 and interacts with the impedance means or magnet 76 to cause the magnet 76 to exert the impedance force above described, as is overcomable by the force of an operator's foot on the pedal by means of a sufficient depression of the pedal to cause the magnet 76 and keeper 80 to reach a spacing such that they no longer attract each other to a measurable or substantial degree.

The speed warner thus described will be found to be very effective in practice giving the overcomable impedance described and permitting the operator to exceed the point at which the impedance operates in order to operate at higher speeds for power in passing on a highway, the springs 300 serving not only to re-position the magnet 76 and its keeper 80 but also serving to give the operator a sense of further resistance when he is at these high speeds. Still further, the springs 300 tend to support the foot pedal lever to prevent unconscious excessive foot pressure commonly known as the "heavy foot."

As thus described, the objectives of this invention are believed fully achieved.

I claim:

1. In combination: an automobile having an engine (10), a firewall (52) rearwardly of said engine, an accelerator foot pedal movably mounted on said automobile and disposed adjacent to and rearwardly of said firewall, and said foot pedal being depressible for acceleration and rising for deceleration, said automobile having a foot pedal controlled moving member (12) disposed forwardly of said firewall (52) and connected to said foot pedal so that said moving member (12) moves in one direction (62) when said pedal is depressed and in an opposite direction (60) when said pedal rises, an impedance assembly (324) comprising an impedance means (76, 80) and further comprising connecting means (88, 90, 92, 96, 14) connecting said impedance means (76) to said moving member (12) whereby when said moving member (12) has reached a certain point during depression of said pedal said impedance means (76, 80) will exert an impedance force to momentarily impede further movement of said moving means in said one direction (62), said impedance assembly further comprising a positioning means (82, 162, 174) for said impedance means operatively engaging said impedance means (76, 80) and interacting with said impedance means (76, 80) to position said impedance means for the exertion of an impedance force, said positioning means for said impedance means having resilient means (300) urging said impedance means (76, 80) towards a positioning for maximum impedance effect of said impedance means (76, 80), said resilient means being overcomable by the sufficient depression of said pedal to cause said moving member to move beyond said point.

2. The combination of claim 1 in further combination with spring means (300) operatively correlated with said impedance assembly and said connecting means so as to resist depression of said pedal following overcoming of said impedance means so as to then provide a continuously sensible warning as said pedal is further depressed and so as to support said pedal against depression, said spring means (300) being overcomable by an operator's foot to permit further pedal depression especially needed when speed is needed for safety.

3. The combination of claim 1 in which said impedance means is a magnet and in which said overcomable impedance positioning means comprises a magnet keeper disposed normally in engagement with said magnet except at times when said pedal is depressed beyond said point.

4. The combination of claim 3 in which said spring means is operably correlated with said impedance means positioning means (80, 162, 174) and further with said impedance means (76) in a manner for urging said keeper and said magnet toward each other so that when the depression of said accelerator pedal has not reached said point, said magnet and keeper will be kept in contact with each other.

5. The combination of claim 4 in which said overcomable positioning means for said impedance means (82, 162, 174) comprises a frame (74) having an elongated interior in which said magnet is slidably disposed lengthwise of said interior so as to be guided by said frame (74), said keeper being mounted in said frame (74), said spring means interconnecting said frame and said connecting means to urge said magnet (76) toward said keeper (80), said impedance means comprising a speed regulator assembly having a body (170) attached to said automobile, a manually movable control member (198) movably connected to said body (170) and movable in each of two directions with respect to said body (170) and said automobile, and means (140, 143, 142, 174, 198) operably correlating and interconnecting said manual control member (198) and frame (74) whereby movement of said manual control member (198) in each of said two directions causes corresponding movement of said frame in directions for regulating the point in accelerator depression at which said magnet (76) is pulled away from said keeper (80).

6. The combination of claim 5 in which said manually movable control member (198) is rotatably connected to said body (170).

7. The combination of claim 3 in which said connecting means (88, 90, 92, 96, 14) comprises a flexible member which has slack in it at times when said accelerator pedal has not been depressed sufficiently to cause said moving member to have reached said point, the said slack being sufficiently small that when said moving member has reached said point during accelerator depression said slack will be taken up.

References Cited
UNITED STATES PATENTS

| | | | |
|---|---|---|---|
| 1,572,186 | 2/1926 | Cook | 74—526 |
| 2,332,064 | 10/1943 | Duffy | 74—526 |
| 2,358,597 | 9/1944 | Russell | 74—526 |
| 2,665,657 | 1/1954 | Dasso | 116—57 |
| 2,732,729 | 1/1956 | Joyce | 116—116 |
| 2,776,581 | 1/1957 | Hamlin | 74—513 |
| 2,818,747 | 1/1958 | Rich | 74—526 |
| 2,825,418 | 3/1958 | Kershman | 74—526 |
| 2,906,141 | 9/1959 | Kocsi | 74—513 |

LOUIS J. CAPOZI, Primary Examiner